United States Patent
Holtcamp

(10) Patent No.: US 6,632,770 B2
(45) Date of Patent: Oct. 14, 2003

(54) CATALYST SYSTEM AND ITS USE IN A POLYMERIZATION PROCESS

(75) Inventor: Matthew W. Holtcamp, Huffman, TX (US)

(73) Assignee: Univation Technologies, LLC, Houston, TX (US)

( * ) Notice: Subject to any disclaimer, the term of this patent is extended or adjusted under 35 U.S.C. 154(b) by 111 days.

(21) Appl. No.: 09/747,821

(22) Filed: Dec. 22, 2000

(65) Prior Publication Data

US 2002/0082369 A1 Jun. 27, 2002

(51) Int. Cl.$^7$ .................... B01J 31/00; B01J 37/00; C08F 4/02; C08F 4/60; C08F 4/44
(52) U.S. Cl. .................... 502/158; 502/125; 502/126; 526/127; 526/131
(58) Field of Search ................ 502/125, 126, 502/158; 526/127, 131

(56) References Cited

U.S. PATENT DOCUMENTS

| | | | | |
|---|---|---|---|---|
| 5,071,808 A | * | 12/1991 | Antberg et al. | 502/107 |
| 5,202,398 A | * | 4/1993 | Antberg et al. | 502/120 |
| 5,332,706 A | * | 7/1994 | Nowlin et al. | 502/107 |
| 5,427,991 A | * | 6/1995 | Turner | 502/103 |
| 5,643,847 A | * | 7/1997 | Walzer, Jr. | 502/117 |
| 5,824,620 A | * | 10/1998 | Vega et al. | 502/117 |
| 6,087,293 A | * | 7/2000 | Carnahan et al. | 502/158 |
| 6,184,171 B1 | * | 2/2001 | Shih | 502/158 |

FOREIGN PATENT DOCUMENTS

| | | | |
|---|---|---|---|
| EP | 0 614 468 B1 | | 9/1997 |
| EP | 0 839 836 | * | 5/1998 |
| EP | 0 863 919 B1 | | 11/2000 |
| WO | 96/04319 | * | 2/1996 |
| WO | WO 96/23005 | | 8/1996 |

OTHER PUBLICATIONS

Mulhaupt, et al., *Organometallics* 1991, vol. 10, No. 9 pp. 3403–3406.

* cited by examiner

*Primary Examiner*—Mark L. Bell
*Assistant Examiner*—J. Pasterczyk
(74) *Attorney, Agent, or Firm*—Lisa Kimes Jones; Kevin M. Faulkner

(57) ABSTRACT

The invention provides new polymerization catalyst activator compositions including a non-coordinating or ionizing activator having a siloxane moiety. The invention also provides a new supported catalyst activator composition and method of making the composition. In one embodiment, the activator composition having a siloxane moiety represented by the formulae:

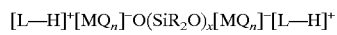

or

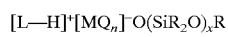

wherein L is an neutral Lewis base;

[L—H]$^+$ is a Bronsted acid or Lewis acid;

n is 3 or 4;

x is a positive integer;

[MQ$_n$]$^-$ is a non-coordinating anion, wherein Q is independently selected from the group consisting of a hydride, a dialkylamido, a halide, an alkoxide, an aryloxide, a hydrocarbyl, a substituted hydrocarbyl, a halocarbyl, a substituted halocarbyl, a halosubstituted-hydrocarbyl radical and combinations thereof, M is an element selected from Group 13 of the Periodic Table of the Elements; and each R is independently selected from the group consisting of a hydrogen, a hydroxyl group, an alkyl, and combinations thereof.

19 Claims, No Drawings

CATALYST SYSTEM AND ITS USE IN A POLYMERIZATION PROCESS

FIELD OF THE INVENTION

The present invention relates to catalyst activator compositions, to methods of making these activator compositions, to polymerization catalyst systems containing these activator compositions, and to olefin(s) polymerization processes utilizing same. In particular, the present application relates to an activator composition that includes a non-coordinating or ionizing activator having a siloxane moiety combined with metal or metalloid support having an aluminumalkyl bonded thereto, to catalyst systems containing these compositions, and to polymerization processes utilizing same.

BACKGROUND OF THE INVENTION

Polymerization catalyst compounds, including bulky ligand metallocene catalyst compounds, are typically combined with an activator (or co-catalyst) to yield compositions having a vacant coordination site that will coordinate, insert, and polymerize olefins. Examples of non-coordinating or ionizing activators include ammonium cations, such as N,N-dimethylanilinium, or trityl cations (triphenylcarbenium or trityl$^+$) combined with non-coordinating/weakly coordinating borate or aluminate anions, such as, for example tetra(perfluorophenyl)borate. The term non-coordinating anion as used herein applies to non-coordinating anions and coordinating anions that are at most weakly coordinated to the cationic complex so as to be labile to replacement by olefinically or acetylenically unsaturated monomers at the insertion site. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299, 5,447,895 and 5,502,124 and U.S. patent application Ser. No. 08/285,380, filed Aug. 3, 1994, all of which are incorporated herein by reference.

The supporting of ionic activators, however, typically results in a significant loss of activity. Supported non-coordinating anions derived from trisperfluorophenyl boron are described in U.S. Pat. No. 5,427,991. Trisperfluorophenyl boron is shown to be capable of reacting with coupling groups bound to silica through hydroxyl groups to form support bound anionic activators capable of activating transition metal catalyst compounds by protonation. U.S. Pat. Nos. 5,643,847 and 5,972,823 discuss the reaction of Group 13 Lewis acid compounds with metal oxides such as silica and illustrate the reaction of trisperfluorophenyl boron with silanol groups (the hydroxyl groups of silicon) resulting in bound anions capable of protonating transition metal organometallic catalyst compounds to form catalytically active cations counter-balanced by the bound anions.

Immobilized Group 13 Lewis acid catalysts suitable for carbocationic polymerizations are described in U.S. Pat. No. 5,288,677. These Group 13 Lewis acids are said to have the general formula $R_nMX_{3-n}$ where M is a Group 13 metal, R is a monovalent hydrocarbon radical consisting of $C_1$ to $C_{12}$ alkyl, aryl, alkylaryl, arylalkyl and cycloalkyl radicals, n=0 to 3, and X is halogen. Listed Lewis acids include aluminum trichloride, trialkyl aluminums, and alkylaluminum halides. Immobilization is accomplished by reacting these Lewis acids with hydroxyl, halide, amine, alkoxy, secondary alkyl amine, and other groups, where the groups are structurally incorporated in a polymeric chain. James C. W. Chien, Jour. Poly. Sci.: Pt A: Poly. Chem, Vol. 29, 1603–1607 (1991), describes the olefin polymerization utility of methylalumoxane (MAO) reacted with $SiO_2$ and zirconocenes and describes a covalent bonding of the aluminum atom to the silica through an oxygen atom in the surface hydroxyl groups of the silica.

While these catalyst activator compounds have been described in the art, there is still a need for improved catalyst activators, for activators suitable for anchoring on supports, for catalyst systems utilizing such activators and for processes for polymerize olefin(s) utilizing same.

SUMMARY OF THE INVENTION

This invention provides new polymerization catalyst activator compositions including a non-coordinating or ionizing activator having a siloxane moiety. This invention also provides a new supported catalyst activator composition where the siloxane moiety reacts with an alkylaluminum bonded to a silica support. The invention also provides for methods of making the activator compositions, polymerization catalyst systems including the activator compositions and processes for polymerizing olefin(s) utilizing same.

DETAILED DESCRIPTION OF THE INVENTION

New activator compositions including non-coordinating anions having a siloxane moiety have been discovered. Supporting these new activators is accomplished by reacting the siloxane moiety with an alkylaluminum attached to a silica support. The resulting supported activator compositions have been found to activate polymerization catalyst compounds and produce less fouling when compared to similarly supported systems not including the siloxane moiety.

In one embodiment, the non-coordinating anion activators having a siloxane moiety of the invention are represented by Formulae (Ia) or (Ib):

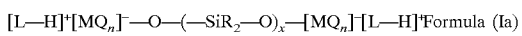
$$[L{-}H]^+[MQ_n]^-{-}O{-}({-}SiR_2{-}O)_x{-}[MQ_n]^-[L{-}H]^+ \quad \text{Formula (Ia)}$$

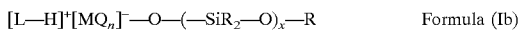
$$[L{-}H]^+[MQ_n]^-{-}O{-}({-}SiR_2{-}O)_x{-}R \quad \text{Formula (Ib)}$$

wherein L is an neutral Lewis base;

[L—H]$^+$ is a Bronsted acid n is 3 or 4;

x is an integer, preferably, x is in integer from 1 to 50, preferably 1 to 20, more preferably 1 to 10, even more preferably x is 3 to 8;

[MQ$_n$]$^-$ is a non-coordinating anion;

M is an element selected from Group 13 of the Periodic Table of the Elements, preferably boron or aluminum, and most preferably boron;

Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms and more preferably each Q is a fluorinated aryl group and most preferably a fluorinated phenyl group;

R is independently a monoanionic ligand, hydrogen, an hydroxyl group or an alkyl, or combinations thereof. Preferably R is an alkyl group containing 1 to 20 carbon atoms and more preferably 1 to 6 carbon atoms. Most preferably, R is methyl. An alkyl group for purposes herein is defined to be a linear or branched alkyl radical, alkenyl radical, alkynyl radical, cycloalkyl radical or aryl radicals, an acyl radical, aryl radical, alkoxy radical, aryloxy radical, alkylthio radical, dialkylamino radical, alkoxycarbonyl radical, aryloxycarbonyl radical, carbomoyl radicals, alkyl- or dialkyl-carbamoyl radical, acyloxy radicals, acylamino radical, aroylamino radical, straight, branched or cyclic alkylene radical, or combination thereof. An arylalkyl group is defined to be a substituted aryl group; and

[L—H]⁺, the cation component, may include Bronsted acids such as protons or protonated Lewis bases or reducible Lewis acids capable of protonating or abstracting a moiety, such as an akyl or aryl, from the catalyst precursors, described below, resulting in a cationic transition metal species.

The activating cation [L—H]⁺ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene and mixtures thereof, preferably N,N-dimethylaniline (DMAH). The activating cation [L—H]⁺ may also be an abstracting moiety such as silver, carboniums, tropylium, carbeniums, ferroceniums and mixtures thereof, preferably carboniums and ferroceniums, and most preferably triphenyl carbonium.

In another embodiment the non-coordinating anion activator having a siloxane moiety is represented by Formulae (IIa), (IIb) or (IIc)

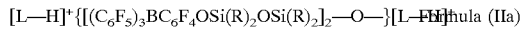  Formula (IIa)

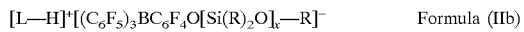  Formula (IIb)

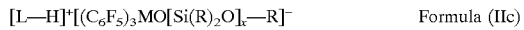  Formula (IIc)

wherein [L—H]⁺, M, R and x are defined as above.

In a most preferred embodiment, the non-coordinating anion activator having a siloxane moiety is represented by the formulae below:

Formula (IIIa)

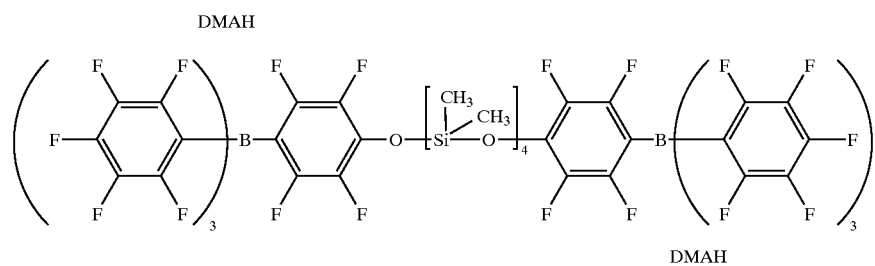

wherein DMAH is $(C_6H_5)(CH_3)_2NH$.

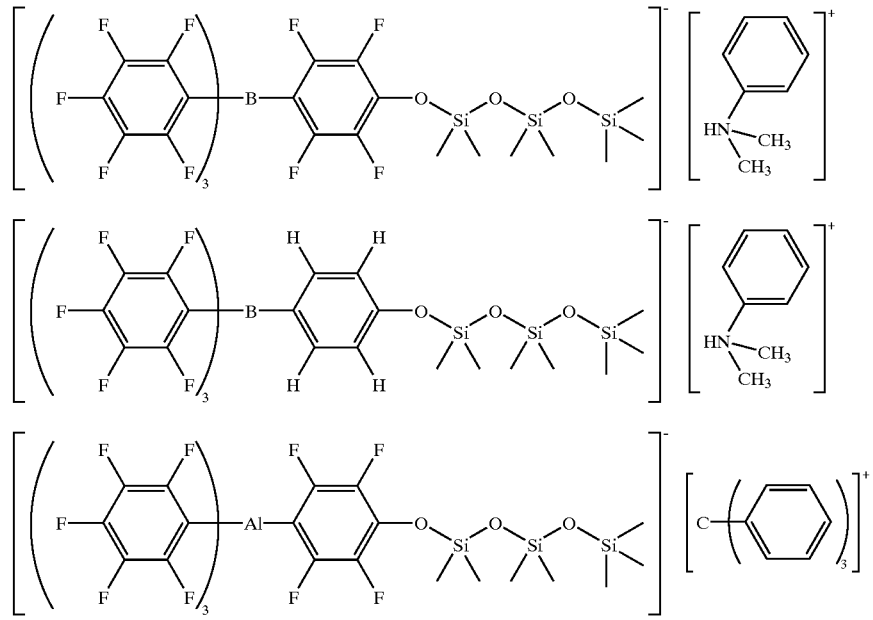

-continued

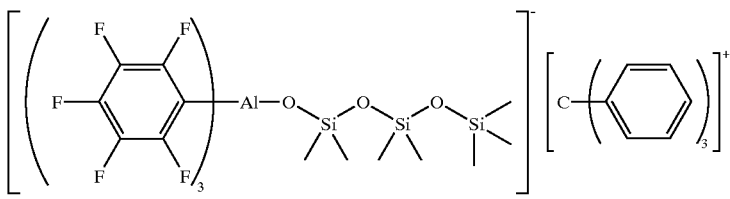

wherein the above are Formula (IIIb), (IIIc), (IIId) and (IIIe) respectively.

In one embodiment, a perfluorinated borate salt with a siloxane moeity is prepared in a series of reaction steps starting with 2,3,5,6-tetrafluorophenol. The phenol is deprotonated in a suitable solvent, an example of which is tetrahydrofuran, and combined with a halogen containing siloxane component to yield a tetrafluorobenzene siloxane compound. The tetrafluorobenzene compound is then deprotonated with a suitable base, an example of which is butyl lithium, then combined with trisperfluorophenyl borane. The resulting lithium salt is converted to the activator by reaction of a dimethylaniline hydrogen chloride in a suitable solvent, an example of which is dichloromethane.

In another embodiment, a perfluorinated borate salt with a siloxane moeity attached to the 4-position of a phenyl ring is prepared in a series of reaction steps starting with 2,3,5, 6-tetrafluorophenol. The phenol is deprotonated in tetrahydrofuran and combined with chlorosiloxane yielding [HC$_6$F$_4$OSi(CH$_3$)$_2$OSi(CH$_3$)$_2$]$_2$—O—. The tetrafluorobenzene compound is then deprotonated with butyl lithium at a suitably low temperature and combined with trisperfluorophenyl borane. The resulting lithium salt is then converted to the activator by reaction of dimethylaniline hydrogen chloride in dichloromethane.

The reactions to prepare the perfluorinated borate salt with a siloxane moeity may be carried out at any suitable pressure and temperature under an inert atmosphere. Preferably, the reactions are carried out at atmospheric pressure under nitrogen. Preferably, the tetrafluorobenzene siloxane compound is cryogenically cooled prior to the addition of the butyl lithium in the second reaction.

In another embodiment, other activators or methods of activation are contemplated for use with the activator(s) described above. For example, the activators of the invention may be used in combination with other activators including alumoxane, modified alumoxane, tri (n-butyl) ammonium tetrakis (pentafluorophenyl) boron, a trisperfluorophenyl boron metalloid precursor or a trisperfluoronapthyl boron metalloid precursor, polyhalogenated heteroborane anions, trimethylaluminum, triethylaluminum, triisobutylaluminum, tri-n-hexylaluminum, tri-n-octylaluminum, tris (2,2',2"-nona-fluorobiphenyl) fluoroaluminate, perchlorates, periodates, iodates and hydrates, (2,2"-bisphenyl-ditrimethylsilicate).4THF and organo-boron-aluminum compound, silylium salts and dioctadecylmethylammonium-bis(tris(pentafluorophenyl) borane)-benzimidazolide or combinations thereof.

Alkylaluminum or Alumoxane Treated Support Materials

The activator complexes of the invention and/or the polymerization catalyst compound, described below, are combined with one or more support materials or carriers, that has been treated with an alkylaluminum or an alumoxane compound, such that the support has aluminum alkyl groups bonded thereto.

Support Materials

The support materials utilized are any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

In another embodiment, any of the conventionally known inorganic oxides, such as silica, support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C. or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g SiO$_2$ are typically suitable and can be achieved, for example, by varying the temperature of calcining from 200 to 800+° C. See Zhuralev, et al, Langmuir 1987, Vol. 3, 316 where correlation between calcining temperature and times and hydroxyl contents of silicas of varying surface areas is described.

The tailoring of hydroxyl groups available as attachment sites in this invention can also be accomplished by the pre-treatment, prior to addition of the Lewis acid, with a less than stoichimetric amount of the chemical dehydrating agents. Preferably those used will be used sparingly and will be those having a single ligand reactive with the silanol groups (e.g., (CH$_3$)$_4$SiCl), or otherwise hydrolyzable, so as to minimize interference with the reaction of the transition metal catalyst compounds with the bound activator. If calcining temperatures below 400° C. are employed, difunctional coupling agents (e.g., (CH$_3$)$_3$SiCl$_2$) may be employed to cap hydrogen bonded pairs of silanol groups which are present under the less severe calcining conditions. See for example, "Investigation of Quantitative SiOH Determination by the Silane Treatment of Disperse Silica", Gorski, et al, Journ. of Colloid and Interface Science, Vol. 126, No. 2, December 1988, for discussion of the effect of silane coupling agents for silica polymeric fillers that will also be effective for modification of silanol groups on the catalyst supports of this invention. Similarly, use of the Lewis acid in excess of the stoichimetric amount needed for reaction with the transition metal compounds will serve to neutralize excess silanol groups without significant detrimental effect for catalyst preparation or subsequent polymerization.

In another embodiment, the support is a Polymeric support, including hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

The support materials may be treated chemically, for example with a fluoride compound as described in WO 00/12565, which is herein incorporated by reference. Other supported activators are described in for example WO 00/13792 that refers to supported boron containing solid acid complex.

Alkylaluminum and Alumoxane Compound

Alkylaluminum compounds may be represented by Formula (IV)

   Formula (IV)

wherein each R is independently a substituted or unsubstituted alkyl group, preferably an alkyl group containing 1 to 30 carbon atoms, wherein alkyl is as defined above.

Non-limiting examples of alkylaluminums include trimethylaluminum, triethylaluminum, triisobutylaluminum, tri-n-hexylaluminum, tri-n-octylaluminum and combinations thereof.

Alumoxanes are generally oligomeric compounds containing —Al(R)—O— or —Al(R)$_2$—O— subunits, where R is an alkyl group. Examples of alumoxanes include methylalumoxane (MAO), modified methylalumoxane (MMAO), ethylalumoxane and isobutylalumoxane, di-ethylalumoxane and di-isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A another alumoxane is a modified methyl alumoxane (MMAO) cocatalyst type 3A (commercially available from Akzo Chemicals, Inc. under the trade name Modified Methylalumoxane type 3A, See U.S. Pat. No. 5,041,584).

In one embodiment, the support material having an alkylaluminum and/or the alumoxane compound bonded thereto may be prepared by combining the aluminum containing compound with the support material in a suitable solvent. In one embodiment, the combining is carried out at any suitable pressure and temperature under an inert atmosphere. Preferably the combining is at atmospheric pressure, ambient temperature under nitrogen. More preferably the mixture is heated to less than about 200° C., more preferably less than 150° C. The reactants are contacted for a suitable about of time for example, for at least about 1 minute, preferably about 1 minute to about 10 hours, more preferably for about 1 minute to about 3 hours.

Supported Catalyst System

Supporting of the non-coordinating or ionizing activator having a siloxane moiety of the invention is accomplished by reacting the siloxane moiety with an alkylaluminum attached to a silica support.

In one embodiment, the anchoring of the activator to a silica support is achieved by reacting the activator having a siloxane moiety with an alumoxane or aluminum alkyl. While not wishing to be limited by theory, it is believed that the reaction of the siloxane moeity on the activator with an alkyl aluminum contributes to anchoring of the catalyst activator on the support. The anchoring of the activator may involve reaction of the siloxane moeity to actually form Al—O—Si linkages (Note trialkylsiloxyalkylaluminum complexes have been prepared via the reaction of siloxanes and alkylaluminums; For example see Mulhaupt, R.; Calabrese, J.; Ittel, S. D. Organometallics 1991, 10, 3403–3406 and references cited within) and/or may simply anchor via a dative interaction of Lewis acidic aluminum sites with the electron pair of the oxygens in the siloxane groups.

In another embodiment, the anchoring of the activator to a silica was support was achieved by reacting the activator having a siloxane moiety with ethylalumoxane or triethylaluminum treated silica, in a suitable, solvent for example toluene. The anchoring of the activator may be carried out at any suitable pressure and temperature under an inert atmosphere. Preferably, the reactions are carried out at atmospheric pressure under nitrogen. In one embodiment, the anchoring is performed at a temperature of between about 1 to about 200° C., preferably between about 20 to about 150° C. and more preferably at about 100° C. The reactants are contacted for a suitable about of time for example, for at least about 1 minute, preferably about 1 minute to about 10 hours, more preferably for about 1 minute to about 3 hours.

Catalyst Compounds

The activator compositions of the invention may be utilized in conjunction with any suitable polymerization catalyst compound(s) to polymerize olefins. Examples of suitable catalyst compounds include bulky ligand metallocene catalyst compositions, metal containing Group 15 polymerization catalyst compositions, and phenoxide transition metal catalyst compositions.

Bulky Ligand Metallocene Catalyst Compositions

The activator compositions of the present invention may be used to activate bulky ligand metallocene catalyst compositions. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds, which may be utilized with the activator composition of the invention, may be represented by the formula:

$$L^A L^B MQ_n \tag{V}$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (V) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the activator composition of the invention is utilized with the bulky ligand metallocene catalyst compounds of formula (VI) where $L^A$ and $L^B$ are bridged to each other by at least one bridging group, A, as represented in the following formula:

$$L^A A L^B M Q_n \quad \text{(VI)}$$

These bridged compounds represented by formula (VI) are known as bridged, above. Non-limiting examples of bridging group A include bridging groups containing bulky ligand metallocene catalyst compounds. $L^A$, $L^B$, M, Q and n are as defined at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (VI) have two or more bridging groups A (EP 664 301 B1).

In another embodiment, the activator composition of the invention may be utilized with bulky ligand metallocene catalyst compounds where the R substituents on the bulky ligands $L^A$ and $L^B$ of formulas (V) and (VI) are substituted with the same or different number of substituents on each of the bulky ligands. In another embodiment, the bulky ligands $L^A$ and $L^B$ of formulas (V) and (VI) are different from each other.

In another embodiment, the activator composition of the invention may be utilized with other bulky ligand metallocene catalyst compounds such as those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are fully incorporated herein by reference.

In another embodiment, the activator composition of the invention may be utilized with bulky ligand metallocene catalysts which include bridged heteroatom, mono-bulky ligand metallocene compounds. These types of catalysts and catalyst systems are described in, for example, PCT publication WO 92/00333, WO 94/07928, WO 91/ 04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In this embodiment, the activator compositions of the invention are utilized with a bulky ligand metallocene catalyst compound represented by formula (VII):

$$L^C A J M Q_n \quad \text{(VII)}$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (VII) above, $L^C$, A and J form a fused ring system. In an embodiment, $L^C$ of formula (VII) is as defined above for $L^A$, A, M and Q of formula (VII) are as defined above in formula (V).

In formula (VII) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the activator composition of the invention is utilized with a bulky ligand metallocene catalyst compound which is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment the activator composition of the invention is utilized with a ligand metallocene catalyst compound which may be represented by formula VIII:

$$L^D M Q_2 (YZ) X_n \quad \text{(VIII)}$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (VIII), L and M are as defined above for formula (V). Q is as defined above for formula (V), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the activator composition of the invention is utilized with a the bulky ligand metallocene catalyst compounds, which include heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the activator composition of the invention may be utilized with bulky ligand metallocene catalyst compounds, which include complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the activator composition of the invention may be utilized with a bulky ligand metallocene catalyst compounds which may be represented by formula IX:

$$((Z)XA_t(YJ))_q MQ_n \quad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene catalyst compounds, which may be utilized with the activator composition of the invention include complexes of Ni$^{2+}$ and Pd$^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene catalysts, which may be utilized with the activator composition of the invention, are those Group 5 and 6 metal imido complexes described in EP-A2-0 816 384 and U.S. Pat. No. 5,851,945, which is incorporated herein by reference. In addition, bridged bis (amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Group 15 Containing Polymerization Catalyst

The activator compositions of the invention may also be utilized with metal containing Group 15 polymerization catalyst compounds. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

Preferably, at least one of the Group 15 atoms is also bound to a Group 15 or 16 atom through another group which may be a C$_1$ to C$_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment of the invention the composition containing alternating atoms of Group 14 and Group 16 may be used to create solutions or emulsions including one or more bulky ligand metallocene catalyst compounds, and one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Metal containing Group 15 catalyst compounds may be represented by the formulae:

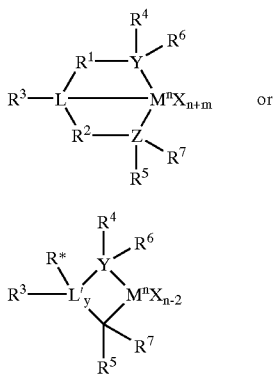

Formula X

Formula XI wherein M is a Group 3 to 12 transition metal or a Group 13 or 14 main group metal, preferably a Group 4, 5, or 6 metal, and more preferably a Group 4 metal, and most preferably zirconium, titanium or hafnium,

- each X is independently a leaving group, preferably, an anionic leaving group, and more preferably hydrogen, a hydrocarbyl group, a heteroatom or a halogen, and most preferably an alkyl.
- y is 0 or 1 (when y is 0 group L' is absent),
- n is the oxidation state of M, preferably +3, +4, or +5, and more preferably +4,
- m is the formal charge of the YZL or the YZL' ligand, preferably 0, −1, −2 or −3, and more preferably −2,
- L is a Group 15 or 16 element, preferably nitrogen,
- L' is a Group 15 or 16 element or Group 14 containing group, preferably carbon, silicon or germanium,
- Y is a Group 15 element, preferably nitrogen or phosphorus, and more preferably nitrogen,
- Z is a Group 15 element, preferably nitrogen or phosphorus, and more preferably nitrogen,
- $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.
- $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen
- $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group,
- $R^1$ and $R^2$ may be interconnected to each other, and/or $R^4$ and $R^5$ may be interconnected to each other,
- $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and
- R* is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

Phenoxide Transition Metal Catalyst Compositions

The activator compositions of the invention may also be used with phenoxide transtion metal catalyst compounds. Generally, these complexes are heteroatom substituted phenoxide ligated Group 3 to 10 transition metal or lanthanide metal compounds wherein the metal is bound to the oxygen of the phenoxide group.

Phenoxide transition metal catalyst compounds may be represented by formula XII or XIII below:

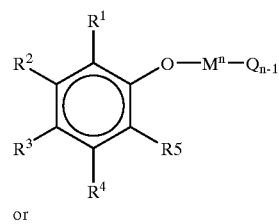

XII or

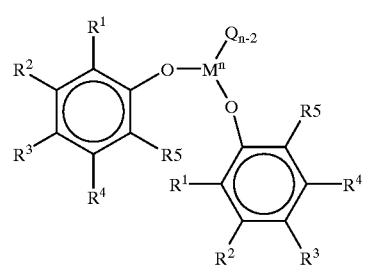

XIII wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M; at least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;

Each $R^1$ to $R^5$ group may be independently substituted or unsubstituted with other atoms, including heteroatoms or heteroatom containing group(s);

O is oxygen;

M is a Group 3 to Group 10 transition metal or lanthanide metal, preferably a Group 4 metal, preferably M is Ti, Zr or Hf;

n is the valence state of the metal M, preferably 2, 3, 4, or 5; and

Q is, and each Q may be independently be, an alkyl, halogen, benzyl, amide, carboxylate, carbamate, thiolate, hydride or alkoxide group, or a bond to an R group containing a heteroatom which may be any of $R^1$ to $R^5$.

A heteroatom containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom containing group may contain one or more of the same or different heteroatoms. Preferred heteroatom containing groups include imines, amines, oxides, phosphines, ethers, ketones, oxoazolines heterocyclics, oxazolines, thioethers, and the like. Particularly preferred heteroatom containing groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably an iminophenoxidezirconium compound.

In another embodiment, it is further contemplated that the above catalysts or catalyst systems may be used in combination with the activator(s) of the present invention.

In one embodiment, the mole ratio of the metal of the activator component of the invention to the metal component is preferably in the range of ratios between 0.3:1 to 3:1.

In one embodiment, a method of forming a supported catalyst system, the amount of liquid, in which the activator of the invention and/or a catalyst compound is present, is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration,* Vol. 28, No. 3, Analytical Chemistry 332–334 (March, 1956).

Polymerization Process

The activators of the invention, catalyst systems and supported catalyst systems utilizing the activators described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbomadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. preferably from about 60° C. to about 115° C. more preferably in the range of from about 70° C. to about 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In another embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is filly incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are filly incorporated herein by reference.

In one embodiment of the process of the invention is the process, preferably a slurry or gas phase process is operated in the presence of the catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. Nos. 5,712,352 and 5,763,543, which are herein fully incorporated by reference.

In another embodiment, the method of the invention provides for injecting a the catalyst system of the invention into a reactor, particularly a gas phase reactor. In one embodiment the catalyst system is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with an activator, and/or a support, and/or a supported activator together or separately to a reactor. The injection methods described in PCT publication WO 97/46599, which is fully incorporated herein by reference, may be utilized. Where an unsupported catalyst system is used the mole ratio of the metal of the Lewis acid activator component to the metal of the phenoxide transition metal catalyst compound is in the range of between 0.3:1 to 10,000:1, preferably 100:1 to 5000:1, and most preferably 500:1 to 2000:1.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a catalyst system of the invention have a CDBI less than 50%, more preferably less than 40%, and most preferably less than 30%.

The polymers of the present invention in one embodiment have a melt index (MI) or ($I_2$) as measured by ASTM-D-

1238-E in the range from no measurable flow to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

2,3,5,6-Tetrafluorophenol [$HC_6F_4OH$] and 2.5 M butyl lithium in hexane were purchased from Aldrich and used as received. 1,7-dichlorooctamethyltetrasiloxane was purchased from Gelest and used as received. Trisperfluorophenylborane was purchased from Boulder Chemical Co. and used as received. All solvents were purchased from Aldrich.

Example 1

Preparation of [$HC_6F_4OSi(CH_3)_2OSi(CH_3)_2$]$_2$—O—

30.0 grams of $HC_6F_4OH$ was dissolved in 400 mls of tetrahydrofuran at −35° C. 7.24 grams of potassium hydride was slowly added to the reaction vessel over a one hour period. Hydrogen evolution resulted. 31.7 grams of 1,7-dichlorooctamethyltetrasiloxane was added to the reaction vessel over a fifteen minute period. The solution became warm. After several hours the solvent was removed. Pentane was added forming a slurry. The slurry was filtered through celite, and the resulting solution was dried under vacuum. $^{19}$F NMR (benzene-d6; ref. to $CF_3C_6H_5$ δ=−62.5) δ−141.0 (m, 4F), −158.1 (d, 4F). Note: A small amount of impurity seen by δ−141.2 shoulder, −163.5 (d). 1H NMR (benzene-d6) δ0.122 (s, 12H), 0.22 (s, 12H), 5.99 (s, 2H).

Example 2

Preparation of [($C_6H_5$)($CH_3$)$_2$NH]$_2$\{[($C_6F_5$)$_3$BC$_6$F$_4$OSi($CH_3$)$_2$OSi($CH_3$)$_2$]$_2$—O—\}

25 grams of [$HC_6F_4OSi(CH_3)_2OSi(CH_3)_2$]$_2$—O— was added to 300 mls of diethyl ether in a one liter Schlenk flask. The flask was equipped with a addition funnel –loaded with 32.8 mls of 2.5 M butyl lithium in hexane. The solution was cooled to 78° C. and butyl lithium was added slowly over the course of one half hour. A milky slurry forms. 42.0 grams of B($C_6F_5$)$_3$ was added in toluene via a cannula. After several hours the solution was allowed to warm to room temperature. The solvent was concentrated to half its original volume. Several pentane washes yielded 49.0 grams of the lithium etherate salt. One equivalent of ($CH_3$)$_2$($C_6H_5$)NHCl (8.00 grams) was added in a solution of dichoromethane. The resulting slurry stirred overnight. The slurry was filtered through celite, and the solution was concentrated under vacuum. The product precipitated from the dichloromethane solution upon addition of pentane. $^{19}$F NMR ($CD_2Cl_2$) ref. to $CF_3C_6H_5$ δ=−62.5) δ−133.9 (m, 12F), −135.6 (4F), −162.1 (br, 4F), −163.7 (m, 6F), −167.7 (m, 12F). $^1$H NMR ($CD_2Cl_2$): δ−0.055(s, 12H), 0.05, 0.23 (s, 12H), 3.34 (s, 12H), 7.3 (m, 4H), 7.4 (s,(br) 2H) 7.6 (m, 6H). [0.05 (m), 0.29 (sh) Note: Small amounts of residual ether was observed: $^1$H NMR: δ1.18 (t), 3.57 (q)].

Example 3

Preparation of Ethylalumoxane Treated Silica 113 grams of a 4.69 wt % solution of ethylalumoxane (ethyl to aluminum ratio 1.6) in heptane was combined with 30 grams of silica (Davison 948 600° C.) in a Fischer-Porter bottle. The resulting slurry was heated for three hours at 100° C. The silica was filtered, rinsed with several 100 ml portions of toluene, and dried under vacuum. The dried silica weighed 37.46 grams.

Example 4

Preparation of Catalyst System A 2.0 grams of ethylalumoxane treated silica was combined with 0.10 grams of [($C_6H_5$)($CH_3$)$_2$NH]$_2$\{[($C_6F_5$)$_3$BC$_6$F$_4$OSi($CH_3$)$_2$OSi($CH_3$)$_2$]$_2$—O—\} in 20 mls of tolene. The slurry was heated for three hours at 100° C. The silica was filtered and combined with 0.048 grams of (1,3-BuMeCp)$_2$ZrMe$_2$ in toluene. After 30 minutes the silica was filtered and dried under vacuum (1.84 grams of supported catalyst.)

Comparative Example 5

Preparation of Catalyst System B 2.0 grams of ethylalumoxane treated silica was combined with 0.10 grams of [($C_6H_5$)($CH_3$)$_2$NH][($C_6F_5$)$_4$B] in 20 mls of toluene. The slurry was heated for three hours at 100° C. The silica was filtered and combined with 0.048 grams of (1,3-BuMeCp)$_2$ZrMe$_2$ in toluene. After 30 minutes the silica was filtered and dried under vacuum (1.7 grams of supported catalyst.)

Example 6

Preparation of Catalyst System C 2.0 grams of ethylalumoxane treated silica was combined with 0.10 grams of [(C$_6$H$_5$)(CH$_3$)$_2$NH]$_2${[(C$_6$F$_5$)$_3$BC$_6$F$_4$OSi(CH$_3$)$_2$OSi(CH$_3$)$_2$]$_2$—O—} in 20 mls of tolene. The slurry was heated for three hours at 100° C. The silica was filtered and combined with 0.048 grams of (CH$_3$Si(1—CH$_2$CH$_2$CH$_2$-2-Ind)(1-Ind)ZrCl$_2$, (Compound 1 shown below) in toluene. After 30 minutes the silica was filtered and dried under vacuum (1.77 grams of supported catalyst.)

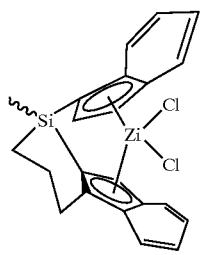

Compound C

Example 7

Preparation of Catalyst System D 2.0 grams of triethylaluminum treated silica (1.2 mmoles of triethylaluminum combined in a pentane slurry of Davison 948(calcined at 600° C.), filtered and dried) was combined with 0.10 grams of [(C$_6$F$_5$)(CH$_3$)$_2$NH]$_2${[(C$_6$F$_5$)$_3$BC$_6$F$_4$OSi(CH$_3$)$_2$OSi(CH$_3$)$_2$]$_2$—O—} in 20 mls of tolene. The slurry was heated for three hours at 100° C. The silica was filtered and combined with 0.048 grams of (CH$_3$Si(1—CH$_2$CH$_2$CH$_2$-2-Ind)(1-Ind)ZrCl$_2$, Compound 1) in toluene. After 30 minutes the silica was filtered and dried under vacuum (1.22 grams of supported catalyst.)

Example 8

Ethylene-Hexene Polymerization using Catalyst System A

Polymerizations were conducted in a stainless steel, 1-liter Zipperclave autoclave reactor. The reactor was equipped with water jacket for heating and cooling. Injections were performed via a high pressure nitrogen injection. (400 mls isobutane, 30 mls of hexene, and 100 μls triisobutylaluminum) Before polymerizations the reactor was purged with nitrogen for several hours at 100° C. Upon injection of catalyst ethylene was fed continuously on demand keeping the reactor pressure constant (130 psig ethylene) while maintaining the reaction temperature at 85° C. After the allotted time the reaction was stopped by cooling and venting the pressure and exposing the contents of the reactor to air. The liquid components were evaporated and the poly(ethylene-co-hexene-1) resin was dried under a N$_2$ purge. Weight average molecular weight (Mw), number average molecular weight (Mn) and their ratio Mw/Mn were obtained by GPC gel permeation chromatography. Hexene wt % incorporation was obtained from $^1$H NMR data.

The above procedure was performed using 25 mgs of Catalyst A. After 40 minutes the reaction was stopped. 45.7 grams of polymer (2740 g pol./g cat. h) was obtained.

Comparative Example 9

Slurry-Phase Ethylene-Hexene Polymerization using Catalyst System B

The polymerization was run according to the procedure outlined above using catalyst B. The polymer resin yield was Run 1:4.7 grams (282 g pol./g cat. h) (Reactor fouling/presumably due to catalyst leaching).

Example 10

Slurry-Phase Ethylene-Hexene Polymerization using Catalyst System C

The polymerization was run according to the procedure outlined above using catalyst C. The polymer resin yield was Run 1:21.2 grams (1270 g pol./g cat. h). Run 2:25.2 grams (1510 g pol./g cat. h).

Example 11

Slurry-Phase Ethylene-Hexene Polymerization using Catalyst System D.

The polymerization was run according to the procedure outlined above using catalyst D. The polymer resin yield was Run 1:32.5 grams (3560 g pol./g cat. h). Run 2:31.4 grams (4770 g pol./g cat. h).

While the present invention has been described and illustrated by reference to particular embodiments, those of ordinary skill in the art will appreciate that the invention lends itself to variations not necessarily illustrated herein. Furthermore, it is contemplated that any one of the embodiment(s) of this invention may be combined with any other embodiment(s) of the invention. For these reasons, then, reference should be made solely to the appended claims for purposes of determining the true scope of the present invention.

I claim:

1. A catalyst system for the polymerization of olefin(s) comprising an activator composition having a siloxane moiety represented by the formulae:

or

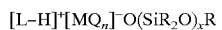

wherein L is a neutral Lewis base;

[L—H]$^+$ is a Bronsted acid or Lewis acid;

n is 3 or 4;

x is a positive integer;

[MQ$_n$]$^-$ is a non-coordinating anion, wherein Q is independently selected from the group consisting of a hydride, a dialkylamido, a halide, an alkoxide, an aryloxide, a hydrocarbyl, a substituted hydrocarbyl, a halocarbyl, a substituted halocarbyl, a halosubstituted-hydrocarbyl radical and combinations thereof;

M is an element selected from Group 13 of the Periodic Table of the Elements; and each R is independently selected from the group consisting of a hydrogen, a hydroxyl group, an alkyl, and combinations thereof.

2. The catalyst system of claim 1 wherein M is boron or aluminum.

3. The catalyst system of claim 1 wherein the activator composition further comprises a support material that has been treated with an alkylaluminum or an alumoxane compound.

4. The catalyst system of claim 1 wherein Q is a fluorinated aryl group.

5. The catalyst system of claim 1 wherein R is an alkyl group.

6. The catalyst system of claim 1 wherein [L—H]⁺ is selected from the group consisting of ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums of triethylphosphine, triphenylphosphine, and diphenylphosphine, oxoniums of ethers, sulfoniums of thioethers, silver, carboniums, tropylium, carbeniums, ferroceniums and mixtures thereof.

7. The catalyst system of claim 1 wherein [L—H]⁺ is N,N-dimethylanilinium (DMAH) or triphenyl carbonium.

8. A method of supporting the activator composition having a siloxane moiety of claim 1 comprising reacting the activator composition with an alkylaluminum attached to a support material.

9. The method of claim 8 wherein the support material is silica.

10. A catalyst system for the polymerization of olefin(s) comprising an activator composition represented by Formulae:

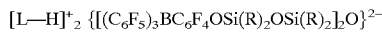

or

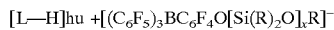

or

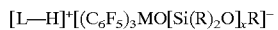

wherein L is a neutral Lewis base;

[L—H]⁺ is a Bronsted acid or Lewis acid;

x is a positive integer;

M is an element selected from Group 13 of the Periodic Table of the Elements; and each R is independently selected from the group consisting of a hydrogen, an hydroxyl group, an alkyl, and combinations thereof.

11. The catalyst system of claim 10 wherein R is an alkyl group.

12. The catalyst system of claim 10 wherein [L—H]⁺ is selected from the group consisting of ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums of triethylphosphine, triphenylphosphine, and diphenylphosphine, oxoniums of ethers, sulfoniums of thioethers, silver, carboniums, tropylium, carbeniums, ferroceniums and mixtures thereof.

13. The catalyst system of claim 10 wherein [L—H]⁺ is N,N-dimethylanilinium (DMAH) or triphenyl carbonium.

14. The catalyst system of claim 10 wherein the activator composition further comprises a support material that has been treated with an alkylaluminum or an alumoxane compound.

15. The catalyst system of claim 10 wherein M is boron or aluminum.

16. A method of supporting the activator composition having a siloxane moiety of claim 10 comprising reacting the activator composition with an alkylaluminum attached to a support material.

17. The method of claim 16 wherein the support material is silica.

18. A process for polymerizing olefin(s) in the presence of a catalyst system comprising an activator composition having a siloxane moiety represented by the formulae:

or

wherein L is a neutral Lewis base;

[L—H]⁺ is a Bronsted acid or Lewis acid;

n is 3 or 4;

x is a positive integer;

[MQ$_n$]⁻ is a non-coordinating anion wherein Q is independently selected from the group consisting of a hydride, a dialkylamido, a halide, an alkoxide, an aryloxide, a hydrocarbyl, a substituted hydrocarbyl, a halocarbyl, a substituted halocarbyl, a halosubstituted-hydrocarbyl radical and combinations thereof;

M is an element selected from Group 13 of the Periodic Table of the Elements; and each R is independently selected from the group consisting of hydrogen, a hydroxyl group, an alkyl, and combinations thereof.

19. A process for polymerizing olefin(s) in the presence of a catalyst system comprising an activator composition having a siloxane moiety represented by the formulae:

or

or

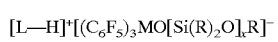

wherein L is a neutral Lewis base;

[L—H]⁺ is a Bronsted acid or Lewis acid;

x is a positive integer;

M is an element selected from Group 13 of the Periodic Table of the Elements; and each R is independently selected from the group consisting of hydrogen, a hydroxyl group, an alkyl, and combinations thereof.

* * * * *